United States Patent
Beeson et al.

(10) Patent No.: US 10,985,943 B1
(45) Date of Patent: Apr. 20, 2021

(54) HARDWARE DEFINED ANYTHING IN A PLATFORM WITH SWAPPABLE PODS, MESSAGE INTERFACE, SANDBOXES AND MEMORY SUPERPOSITION

(71) Applicant: Concurrent Ventures, LLC, Johns Creek, GA (US)

(72) Inventors: Jesse D. Beeson, Johns Creek, GA (US); Jesse B. Yates, Atlanta, GA (US)

(73) Assignee: Concurrent Ventures, Johns Creek, GA (US)

(*) Notice: Subject to any disclaimer, the term of this patent is extended or adjusted under 35 U.S.C. 154(b) by 0 days.

(21) Appl. No.: 16/035,674

(22) Filed: Jul. 15, 2018

(51) Int. Cl.
*H04L 12/46* (2006.01)
*H04L 29/06* (2006.01)
*H04L 12/24* (2006.01)
*G06F 21/53* (2013.01)
*H04L 12/771* (2013.01)

(52) U.S. Cl.
CPC .......... *H04L 12/4604* (2013.01); *G06F 21/53* (2013.01); *H04L 41/082* (2013.01); *H04L 45/56* (2013.01); *H04L 63/08* (2013.01); *H04L 69/08* (2013.01); *H04L 69/18* (2013.01); *G06F 2221/034* (2013.01)

(58) Field of Classification Search
CPC .............. H04L 12/462; H04L 12/4625; H04L 29/06163; H04L 12/5601; H04L 45/50; H04L 2012/5665; H04L 12/56; H04L 2012/56; H04L 12/66; H04L 2012/46; H04L 2012/5618; H04L 12/46; H04L 12/40097; H04L 12/40091
USPC ..... 370/285, 401, 402, 360, 359, 389, 395.5
See application file for complete search history.

(56) References Cited

U.S. PATENT DOCUMENTS

| | | | | |
|---|---|---|---|---|
| 5,809,233 A | * | 9/1998 | Shur | H04L 12/4608 340/9.14 |
| 5,999,179 A | * | 12/1999 | Kekic | H04L 41/0213 715/734 |
| 6,307,839 B1 | * | 10/2001 | Gerszberg | H04J 3/1682 370/230 |
| 7,397,788 B2 | * | 7/2008 | Mies | H04L 12/42 370/230 |
| 10,505,868 B2 | * | 12/2019 | Mackie | H04L 41/12 |
| 2011/0107398 A1 | * | 5/2011 | Earl | H04L 9/32 726/3 |
| 2018/0007005 A1 | * | 1/2018 | Chanda | H04L 63/0236 |

* cited by examiner

*Primary Examiner* — Brenda H Pham

(57) ABSTRACT

A programmable device for data flow processing in a user-configurable server with swappable pods or cards is provided. The device includes a field programmable logic device (PLD) having a first region and a second region. The first region comprises a hardware-based or firmware-based router with a port enabling communication between the router and the second region, and the second region comprises one or more sandboxes with user-definable electronic circuits.

18 Claims, 10 Drawing Sheets

HARDWARE DEFINED ANYTHING IN A PLATFORM WITH SWAPPABLE PODS, MESSAGE INTERFACE, SANDBOXES AND MEMORY SUPERPOSITION

BACKGROUND

Software-based systems are appropriate for many data flow and data processing applications. Yet, there are many situations where dedicated electronic hardware is faster at processing data than software. However, redesigning dedicated hardware each time a new data processing application or data formatting requirement comes up is an expensive proposition. And, designing, debugging and manufacturing dedicated electronic hardware is time-consuming, especially when revision cycles are taken into account. Video processing is one such data processing application, in which there are many different standards, and new standards are being introduced, resulting in the need for flexible solutions for data processing. Therefore, there is a need in the art for a solution which overcomes the drawbacks described above.

SUMMARY

In some embodiments, a platform for data flow processing is provided. The platform, which can be a computing device includes one or more swappable pods or cards in one or more chassis, coupled through a module messaging interface network. Each of the one or more swappable pods or cards having one or more hardware modules or one or more software modules and one or more of the plurality of swappable pods or cards having a portion for user-definable hardware modules or user-definable software modules. The plurality of swappable pods or cards being user-configurable to implement data flow processing architectures.

A programmable device for data flow processing in a user-configurable server with swappable pods or cards is provided. The device includes a programmable logic device (PLD) having a first region and a second region. The first region comprises a hardware-based or firmware-based router with a port enabling communication between the router and the second region, and the second region comprises one or more sandboxes with user-definable electronic circuits.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 6B-1 through 6B-3 illustrate a schematic diagram illustrating the use a variable width buses in conjunction with the MMI protocol in accordance with some embodiments.

DETAILED DESCRIPTION

Embodiments of a single or multi-chassis server with a variety of flexible features for hardware-defined and software-defined functionality in data streaming and data processing systems, including video, are herein disclosed. The server or system is user-configurable and user-reconfigurable, with user-definable hardware modules and user-definable software modules, to implement data flow processing architectures. Pods and cards are removable, insertable, replaceable and optionally hot-swappable in the chassis. A pod may refer to a module for bulk storage for any type of data and may optionally be referred to as a module or a card. Various combinations of hardware modules, software modules and memories of various types are coupled through a Module Message Interface (MMI) network that supports communication directly among modules. Unlike processor-centric systems with operating systems and hardware subordinate to a centralized processor or group of processors, in many of the embodiments the processors, where present, are considered subordinate to the hardware. It should be appreciated that in some embodiments described herein the workload can be offloaded from a programmable logic device to a processor for tasks that can be done serially and/or slower. A header on Module Message Interface packets specifies chassis, board, module, instance and type identifiers, so that packets in the MIMI network are routed to a hardware or software module in a pod or card in the chassis or one of multiple chassis. An FPGA (field programmable gate array), PLD (programmable logic device), ASIC (application specific integrated circuit), or some hybrid of FPGA/PLD/ ASIC, which can be used in pods and cards, has a bridge with an MMI router, and one or more sandboxes for user-defined electronic circuits, optionally including processors. Some embodiments use memory superposition, where multiple types of memory, for example multiple types of RAM (random-access memory), are used in a specified data flow. Multiple examples are shown of data flow processing architectures that can be configured from MMI network coupled hardware and software modules in pods and/or cards, in various embodiments.

Figure 1A:
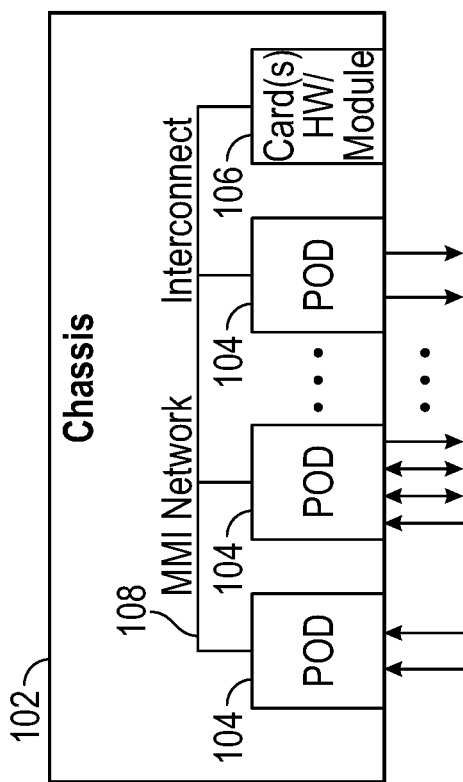
FIG. 1A is a block diagram of a single chassis version of a server or platform with swappable pods and Module Message Interface (MMI) network in accordance with some embodiments.

FIG. 1A is a block diagram of a single chassis version of a server with swappable pods 104 and Module Message Interface network. A chassis 102 houses various pods 104 and/or cards 106, and may also have one or more power supplies, fans, rails for sliding pods or cards, connectors, a midplane and/or a backplane, and other fixtures and components commonly used in and available for a chassis. Some or all of the pods 104 and/or cards 106 have one or more inputs, outputs and/or bidirectional ports or connectors, for coupling to external signal or communication sources or destinations. A pod 104 or a card 106 may also have direct connections to one or more other pods 104 or cards 106. Usually, the majority or all of the pods 104 and/or cards 106 have an MMI network connection 108 to each other, although it is possible a pod 104 or card 106 may have only internal connections and connections to another pod 104 or card 106 but no MMI network connection/interconnect 108, for example when a pod 104 or card 106 is a subordinate or slave to another pod 104 or card 106. It should be appreciated that MMI network connection 108 does not specify the physical layer, but refers the protocol in some embodiments and may be referred to as an interconnect. Thus, MMI could layer on PCIe, Ethernet, direct serial or parallel connection, or any other suitable connection. Pods 104 and cards 106 can be identical, i.e., multiple instances of the same type of pod 104 or card 106, or can be differing. One or more routers, for the MMI network, can be internal to the server, or external. In some embodiments, each pod 104 or card 106 has a router.

Figure 1B:
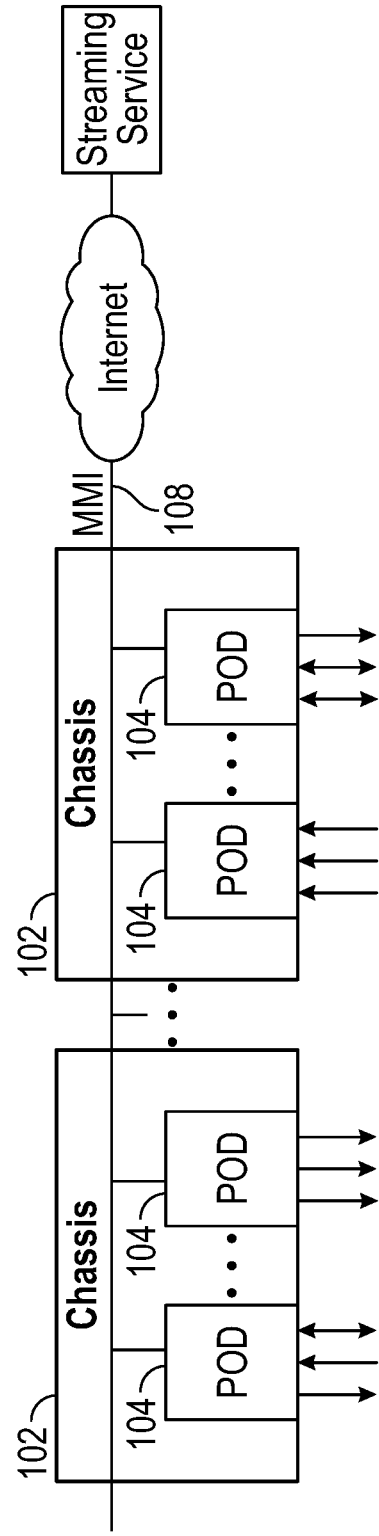
FIG. 1B is a block diagram of a multi-chassis version of a server or platform with swappable pods and Module Message Interface network in accordance with some embodiments.

FIG. 1B is a block diagram of a multi-chassis version of a server with swappable pods 104 and Module Message Interface network. As in the single chassis version of FIG. 1A, the pods 104 and/or cards 106 (not shown, but see FIG. 1A) are coupled to the MMI network connection 108 and thus to each other through the MMI network. The MMI network connection/interconnect 108 couples one chassis 102 to each other chassis 102 in the system, for example through electrical or optical cable, and is available for coupling to further components or systems external to the multi-chassis server. Again as in the single chassis version, one or more routers for the MMI network can be internal or external. In some embodiments, each chassis 102 has one or more routers and may be connected to a streaming service via the Internet or some other connection.

Figure 2:
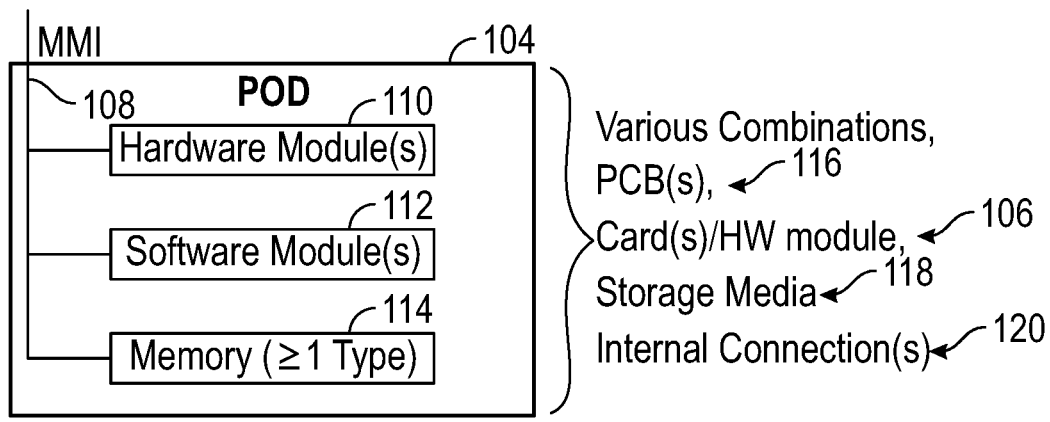
FIG. 2 is a block diagram showing internal components of a pod for the servers/platforms of FIGS. 1A and 1B in accordance with some embodiments.

FIG. 2 is a block diagram showing internal components of a pod 104 for the servers of FIGS. 1A and 1B. The pod 104 has an MMI network connection/interconnect 108, which can be made through wiring, fiber optics, signal traces, connector(s), etc., coupled to or coupling one or more hardware modules 110, one or more software modules 112 and/or memory 114, which can be of one or more differing types, in various combinations. One or more printed circuit boards (PCBs) 116, one or more cards 106, and/or one or more storage media devices 118 such as hard disk drives, solid-state drives, optical drives, etc., with various internal connections 120, can be included in various combinations in a pod 104. Internal connections 120 are for the hardware modules 110, software modules 112 and/or memory 114 to couple to the MMI network connection 108, either directly or through other components, and may also include internal connections among modules and/or memory 114 that bypass or do not go through the MMI network connection 108. In some embodiments, internal connections 120 can also include connections among pods 104 and/or cards 106, again bypassing or not going through the MMI network connection 108. An internal connection 120, among or between hardware modules 110, software modules 112, and/or memory 114 in various combinations, could be made by ports, signal lines, buses, hardware FIFO (first in first out) queues, etc. These same components and possibilities apply further to cards 106, which are generally of a smaller form factor than a pod 104, and can be inserted into a pod 104 or inserted into a chassis 102 in various embodiments.

Figure 3:
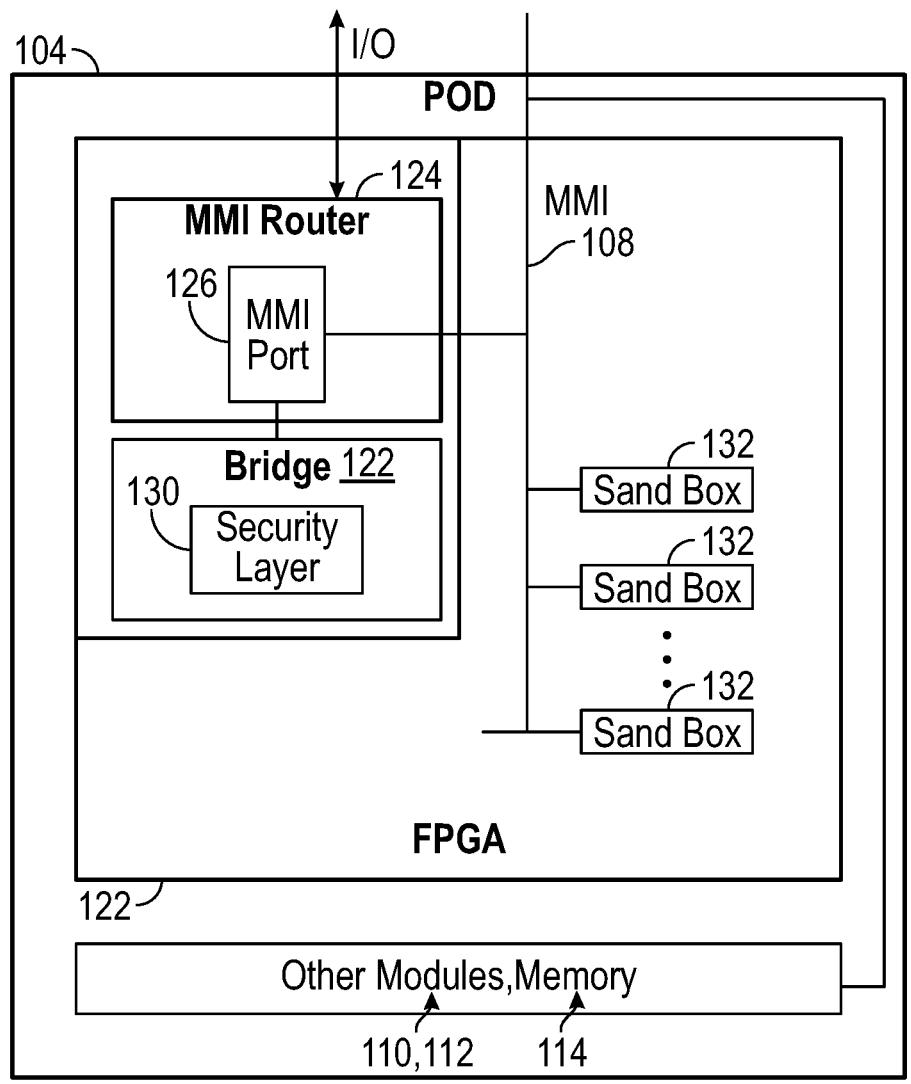
FIG. 3 is a block diagram of a programmable device for the servers of FIGS. 1A and 1B, with a Module Message Interface router, a bridge, and sandboxes for configurable modules in accordance with some embodiments.

FIG. 3 is a block diagram of a programmable device for the servers of FIGS. 1A and 1B, with a Module Message Interface router 124, a bridge 128, and sandboxes 132 for configurable modules. The programmable device could be, for example, an FPGA 122 as depicted here, a PLD or an ASIC, or more than one of these, or some combination of these, or other programmable device that can configure electronic circuitry, in some versions including one or more processors or controllers. Many such programmable devices are programmed according to a program memory, and are reprogrammable, others are programmed once during manufacturing, for example one time programmable (OTP) or application-specific integrated circuits. In FIG. 3, the programmable device is an FPGA 122 in a pod 104, for example mounted to a printed circuit board that is one of one or more printed circuit boards in the pod 104, but the programmable device could also be in a card 106. In some embodiments of the server, the majority of the pods 104, or all of the pods 104, and the majority of the cards 106, or all of the cards 106 if present in the system, each have a programmable device similar to the one depicted in FIG. 3, or variation thereof.

The FPGA 122 has multiple sections in some embodiments, one of which is a bridge 128 for external communication, for example a serial connection to an external network or a parallel connection to an external bus and shown generally as I/O, and internal communication. The bridge 128 is thus a communication bridge between the outside of the server or system, and internal modules and/or memory, and has at least two ports, I/O for external communication and MMI for internal (and possibly also external) communication. The bridge 128 is a module that sits on a router port, for purposes of crossing the I/O type or protocol (i.e., from a wide internal parallel bus to PCIe, or Ethernet, etc). The bridge 128 may contain a security layer 130, and in some embodiments is a firewall for MMI message traffic policies. In turn, the MMI network connection 108 connects to one or more sandboxes 132 in other sections of the FPGA, and can connect to other modules 110, 112 and/or memory 114 elsewhere in the pod 104. The bridge 128 can translate between whatever protocol is used on the I/O connection to devices or systems external to the server, and the MMI network protocol (see FIG. 6). In some embodiments, the MMI router 124 is hardware-based, that is it lacks a processor. In other embodiments, the MMI router 124 is firmware-based, that is it has a dedicated processor with dedicated software that is not otherwise user programmable nor part of an operating system. In some embodiments, the MMI router 124 has both hardware-based and software-based implementations. In some versions, modules communicate to the MMI router 124 and inform the MMI router 124 of their addresses and/or identifiers, which information the MMI router 124 stores locally, for example in a table. In one embodiment, the MMI router 124 gathers statistics such as communication bandwidth, possibly on a per module basis for analysis, telemetry, decision making, etc. The MMI router 124 could tap off and record messages, or perform predictive analytics, such as determining how close the system is to full capacity of the resources or full capacity of the router itself.

Each of one or more sandboxes 132 on the FPGA 122 is designated for programmable electronic circuits, which could include analog circuitry, digital circuitry, memory, one or more processors or controllers, etc., in various combinations, with the intent of providing user-programmable functionality for user customization of one or more pods 104 or cards 106. For example, a user could define an analog, digital or mixed-signal hardware module 110, or a software module 112 in embodiments with processor or controller availability in the FPGA 122, or more than one of these or some combination of these, in one or more sandboxes 132. In some versions, the bridge 128 is locked to prevent user access, in an FPGA 122 that supports partial reconfiguration, so that a user can configure or reconfigure one or more modules in one or more sandboxes 132, but cannot reconfigure the bridge 128. Configuration or reconfiguration of a sandbox 132 is performed through the MMI network in some versions, through the I/O of the FPGA 122 in other versions, and through the I/O of the FPGA 122, the MMI router 124 and the MMI network in still further versions.

In some embodiments, the bridge 128 has a security layer 130. One of the functions of the security layer 130 could be to protect the circuitry of the bridge, including the MMI router 124 in embodiments that have one, from being reprogrammed. Another function of the security layer 130 could be authentication of a user or other verification of permission to reconfigure a sandbox 132. Various further security functions are readily devised and implemented. In some embodiments the security layer 130 could be a firewall for MMI message traffic based on static or dynamic policy or rules.

Many features could be implemented in the sandboxes 132. User-definable hardware modules and user-definable software modules are possible, and could include dynamic port interfaces to processing elements or other modules, configurable as to data width and/or speed, or direct connect (e.g., serial link or parallel bus) versus hardware queue (e.g., FIFO) or software queue. Dynamic or automatic table creation could be based on what processing elements are connected. Scalable performance and resource utilization is possible. Clock cycle utilization can be regulated, such as for controlling power consumption or thermal characteristics. Port interfaces could support off-chip, off-board and off-chassis routing to processing elements. Ports can be defined so that no single processing element can stall the router. In some embodiments one or more sandboxes 132 could be logically or physically combined to form a larger sandbox with additional MMI access resources or capability. Sandboxes 132 can be of differing resource sizes and MMI ports 126. It should be appreciated that sandboxes 132 may present one common and unified interface that couples the sandboxes 132 to a network of other resources which may or may not include other sandboxes 132 in some embodiments.

High-speed message passing mechanisms between processing elements, between processing elements and hardware, or between or among hardware modules 110 can be defined in hardware (i.e., electronic circuits without processor intervention) to route messages containing source and destination identifiers (see example MMI packet in FIG. 6) more quickly and efficiently than typical software-based mechanisms. Use of dedicated hardware for message passing avoids the general problems and time delays/latency of software-based mechanisms, such as required uses of mutex (a lock, based on mutual exclusion) or semaphores, memory bandwidth consumed as a result of memory thrashing, cache coherency issues, time loss with cache flushes or inefficiencies of bypassing cache, difficulty in debugging software, etc.

In the FPGA 122, multiple processing elements, e.g., processors or processor cores may be available. Dedicating one or more processors or processor cores to a task or function may be computationally more efficient than multithreading or multitasking with a single, more powerful processor or core, as a result of true parallel processing and eliminating software overhead for the multithreading or multitasking.

By deeply embedding processing elements in hardware, tasks can be highly integrated into hardware offload and acceleration modules. Hardware modules 110 can form an extension of processing elements, which are running software. Hardware offload/acceleration modules may extend software in a coprocessor type situation or may perform much larger intelligent tasks. The combination is a hybrid hardware+software processing element, where the software provides a thin layer that interconnects all of the hardware submodules. In many such embodiments, the FPGA 122 directly bridges together the network interfaces, hardware modules 110, software modules 112, and various types of memory and storage media devices for the data flow and data path. Thus, the critical data flow path does not loop through an application CPU with operating system (OS), but is instead bridged with a multiplicity of deeply embedded processing elements. System performance is maximized with hybrid hardware and software data processing.

Figure 4:
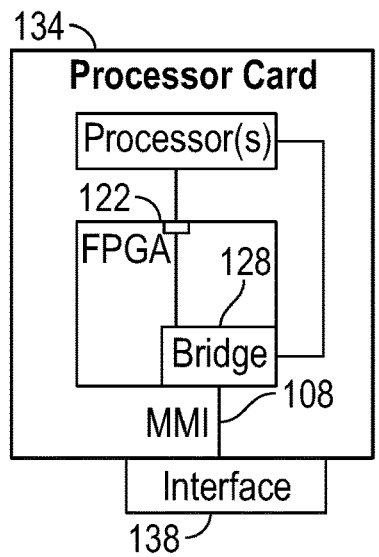
FIG. 4 is a block diagram of a processor card for the servers or platforms of FIGS. 1A and 1B in accordance with some embodiments.

FIG. 4 is a block diagram of a processor card 134 for the servers of FIGS. 1A and 1B. one or more processors 136 are available for software modules 112, processing tasks, configuration of components in the system, etc. Communication with the processor(s) 136 is through the FPGA 122, one or more bridges 128, and the MMI network connection 108 and an interface 138, which could be a port or connector. Possible uses for a processor 136 include offloading hardware tasks to software, orchestrating data flows, orchestrating configurations or reconfigurations of hardware modules 110 and/or software modules 112, and executing software from software modules 112 when or if a processor is not available elsewhere, e.g., in a sandbox 132 or another card 106 or pod 104. Processors 136 can be allocated as a resource, in some sense as a virtual computing resource. Embodiments of the processor card 134 can be inserted into a chassis 102 or a pod 104, or integrated into a pod. Ease of replacement, upgrade or addition of a processor card 134 confers flexibility in computing resources for the server.

Figure 5:
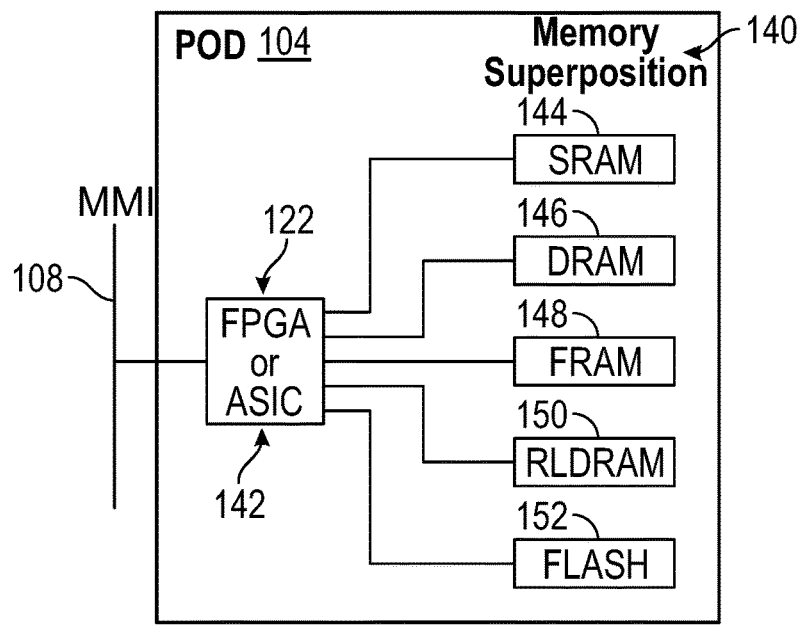
FIG. 5 is a block diagram depicting memory superposition in an embodiment of a pod in accordance with some embodiments.

FIG. 5 is a block diagram depicting memory superposition 140 in an embodiment of a pod 104. Memory superposition 140 can also be in a card 106, or shared across multiple pods 104 cards 106, in further embodiments. For memory superposition 140, two or more types of memory, such as SRAM (static random access memory) 144, DRAM (dynamic random access memory) 146, FRAM (ferroelectric random-access memory) 148, RLDRAM (reduced latency dynamic random access memory) 150, flash 152 (electrically erasable programmable read-only memory or EEPROM), 3D Xpoint, etc., are made available for a data flow or other data processing operation. In some embodiments, memory superposition 140 uses multiple types of RAM. The various types of memory are connected to an FPGA 122 or ASIC 142, or other circuitry designed to couple to and communicate with each type of memory and also couple to and communicate with the MMI network connection 108. It should be appreciated that FIG. 5 may be extended to processing element superposition where a task or work load is given and the task or work load may be carried out in hardware on FPGA, ASIC, or in software in a softcore or hardcore, etc., or some dynamic combination of all.

Each type of memory has an optimal use. SRAM is expensive to produce per bit, thus densities are low. However SRAM is fast and pays no penalty (e.g., latency, delay) for random-access reads nor writes. By contrast, flash is fast on read but slower on write, and less expensive per bit than SRAM and so has higher densities. With DRAM there is a penalty to be paid for random-access, as a result of page open and close requirements. In addition DRAM must be refreshed periodically, which affects usable bandwidth. However, DRAM is fast and inexpensive per bit compared to SRAM, and is thus available in much higher densities at relatively low cost (e.g., DDR3 (double data rate type three synchronous DRAM) memory in personal computers), further reducing costs due to high volume. RLDRAM is between SRAM and DRAM in density, speed and cost. RLDRAM has a higher penalty for random-access than SRAM, but a lower penalty than DRAM, and cost per bit is lower than with SRAM but higher than for DRAM. Thus available densities for RLDRAM are larger than SRAM but lower than DRAM. Analogous to the overlapping of waves to form a final observed wave in wave superposition, where each wave contributes to the whole, in this case different types of memory are being overlapped, each with benefits and drawbacks, to form a final memory system which performs optimally in a given video stream or other data flow/data processing task. In embodiments extended to processing elements each type of processing element has an optimal use. For processing elements, factors include speed, performance, power consumption, thermal, parallel vs serial processing etc. Thus one skilled in the art would appreciate that processing element superposition where a task or work load is given and the task or work load may be carried out in hardware on FPGA, ASIC, or in software in a softcore or hardcore, etc., or some dynamic combination of all of the above may be substituted for the memory superposition described herein.

For example, during identification and classification of network traffic, lookup tables are typically implemented for hashing, direct lookup, linked lists, binary search, etc. In order to perform these tasks within an allotted time before the next arriving packet, it is important to have deterministic and guaranteed memory access times, as well as random-access since traffic can come in any order. Until traffic is classified, one is unable to filter out certain traffic nor determine priority, thus all traffic must be checked in some way. SRAM is well-suited for this use. Once classified there are often other tables and metadata that must be maintained in order to perform some useful function with classified traffic (such as tracking, prioritization, routing, sequencing, grouping, etc. For this, there is a need for more memory capacity to store metadata, while still maintaining high random-access. RLDRAM is well-suited to this use. Following this stage, there is typically some other processing required which involves even more memory in order to accomplish, such as decoding digital video or capturing traffic. By this stage, the random-access can be significantly reduced due to sequencing and prioritization. DRAM is well-suited to this need for the highest memory capacity and potentially reduced random-access. Thus, in this embodiment, the memory system is made optimal by superposition of SRAM, RLDRAM and DRAM, which increases overall performance and reduces overall cost. It may also be advantageous to have the same data in multiple types of ram for different types of access needed at different times. In a similar vein it may be advantageous to a given processing element implemented in both hardware and software to dynamically direct a task based on various factors at the time the task is received.

In combination with a unified memory or processing element interface that abstracts the multiplicity of other memory or processing element interfaces, and communicates through a single interface, such as the MMI network. Memory and/or processing superposition 140 offers multiple types of memories or processing elements that are in a sense virtualized and can be assigned or allocated to the same or differing address ranges according to bandwidth, density, latency or other readily parameterized task needs, and reconfigured for subsequent tasks. One arrangement of the memory superposition 140 is as multilevel cache, e.g., level 1, level 2, level 3 cache. Data could be kept or moved among levels through an LRU (least recently used) algorithm. Another arrangement of memory superposition 140 is interleaved memory, to achieve an average access bandwidth. Input bandwidth, output bandwidth, or power could be blended among different types of RAM or drives such as rotational or disk drives versus solid-state drives, storage media modules, and different drive interfaces. Yet another arrangement of memory superposition 140 is swapped memory over a specified address range. Further arrangements of memory superposition 140 are readily devised in keeping with the teachings herein and the needs of a given task or data flow. Memory can be virtualized, in some embodiments.

Figure 6A:
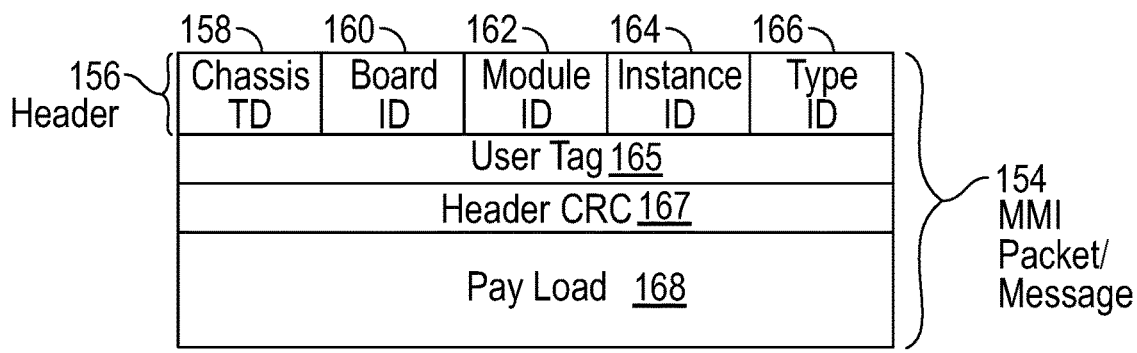
FIG. 6A depicts an example of Module Message Interface network packet or message format, as used in communication among hardware and software modules in the server or platform with swappable pods in accordance with some embodiments.

FIG. 6A depicts a Module Message Interface network packet 154, as used in communication among hardware and software modules 110, 112 in the server with swappable pods 104. The packet 154 has a header 156, with fields specifying destination, and a payload 168, with data to be sent to the destination, and may have other data. The header 156, in one embodiment, specifies a chassis ID (identifier) 158, a board ID 160, a module ID 162, an instance ID 164, and a type ID 166, the combination of which uniquely specifies each hardware module 110 and software module 112. It should be appreciated that further information may be integrated into the header 156, such as header length, a header CRC, user tag, etc. Address parameters, for instance ranges of addresses or offsets may also be specified in the header 156. For example, an MMI packet 154 could be destined to chassis number two, board number three in that chassis, module number seven on that board, instance number three of that module on that board, and the module being a hardware type. Hardware modules 110 can be addressed directly through the header 156, while communications to software modules 112 are sent to the processor card 134, a pod 104 or card 106 with one or more processors, or a pod 104 that may further have one or more sandboxes 132, and then sent internally within that resource to the software module 112 or otherwise processed as befits circumstances specific to the software module 112. For correct routing, the MMI router 124 should be informed of the locations of software modules 112, as well as the hardware modules 110. At the MMI router 124, the fields in the header 156 of the packet 154 are resolved to addresses, much like or as a port number, a memory address or other address in an address space. Variations on the header 156 and variations on the packet 154 are readily devised in keeping with the teachings herein. For example, some versions have source information in the header 156. A resource manager, for providing information for address resolution to the MMI router 124, could be implemented in hardware, software, or even in the cloud (i.e., the global communication network known as the Internet, and contents thereof known as the World Wide Web). Module identifiers could be static (typically, for hardware) or dynamic (typically for software). As explained below the header CRC 167 may be utilized to validate the routing portion without having to check the CRC on the whole message/packet. For many messages, such as command and response, a user tag 165 is blindly returned in the response to a command in some embodiments. In further cases the user tag 165 may also provide additional routing information for certain use cases. The user tag 165 in some embodiments is protected by the header CRC 167.

Figures 1, 6B:
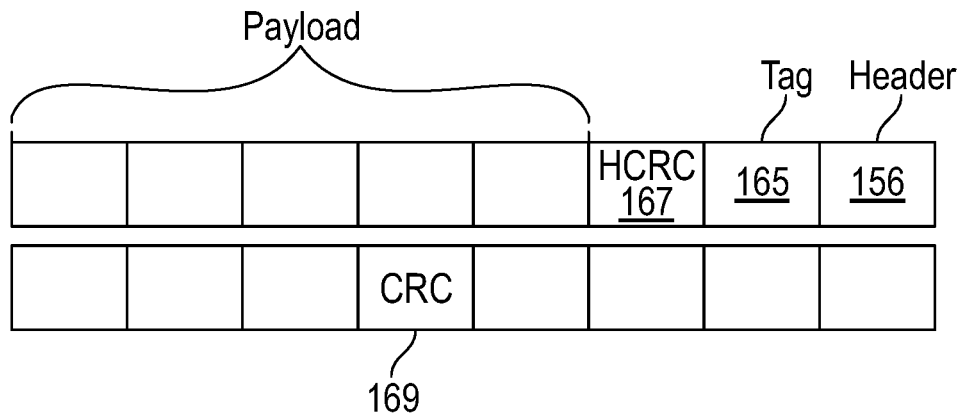
Figures 2, 6B:
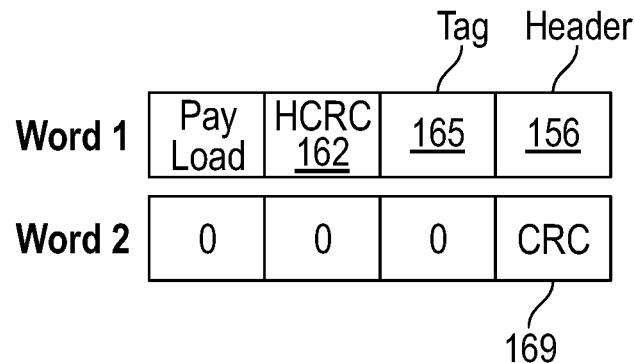
Figures 3, 6B:
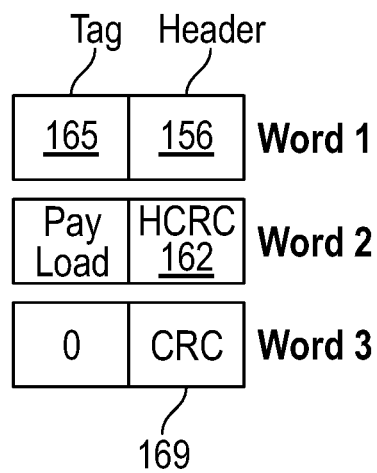

FIGS. 6B-1 through 6B-3 illustrate a schematic diagram illustrating the use a variable width buses in conjunction with the MMI protocol in accordance with some embodiments. It should be appreciated that different bus widths may be utilized based on throughput needs, application requiring maximum speed will use the widest bus while applications not requiring full speed can use a narrower bus. FIG. 6B1 illustrates a scheme for an 8 wide bus, FIG. 6B-2 illustrates a scheme for a 4 wide bus, and FIG. 6B-3 illustrates a scheme for a 2 wide bus. The embodiments guarantee that the CRC 169 can be calculated on the bus width boundary of the data width in an efficient manner. This mechanism is enabled by requiring that the CRC 169 begins on the boundary of the bus width and not the 64 bit word width. In the embodiments, the CRC 169 is always on a word based on the bus width. That is, header 156, tag 165, header CRC 167 is followed by payload 168 and then CRC 169 follows on the bus width boundary for the next word in each of FIGS. 6B-1-3. It should be appreciated that the embodiments allow for the efficient encoding and decoding. While CRCs are discussed above, in some embodiments, e.g., with a highly reliable connection, the CRC is optional.

Figure 7:
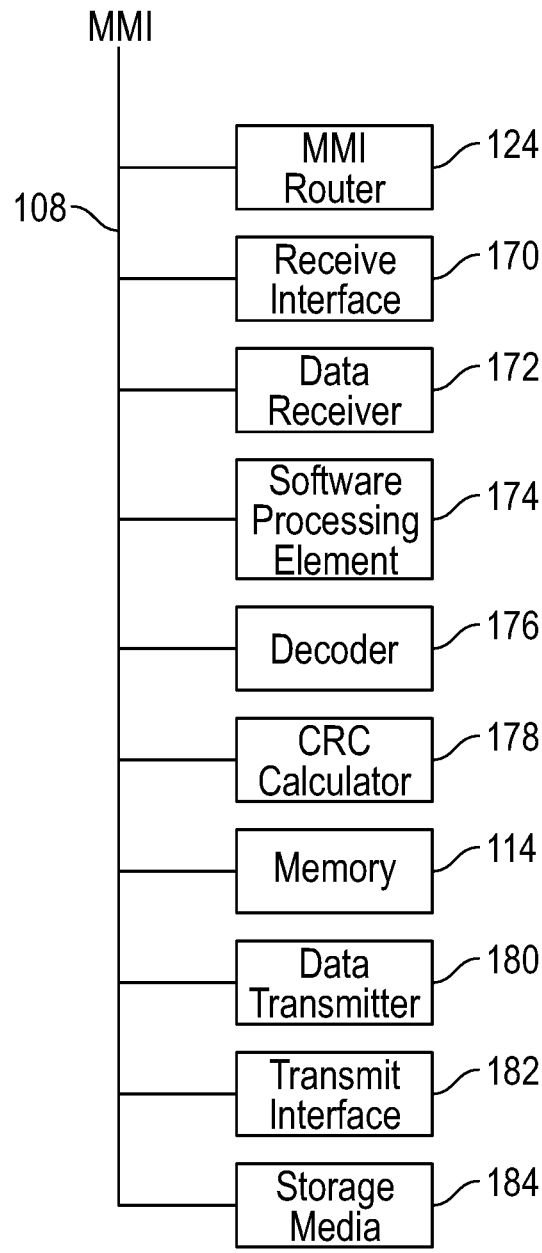
FIG. 7 is a block diagram of various modules coupled to the Module Message Interface network connection, in an embodiment of the server or platform of FIG. 1A in accordance with some embodiments.
Figure 8:
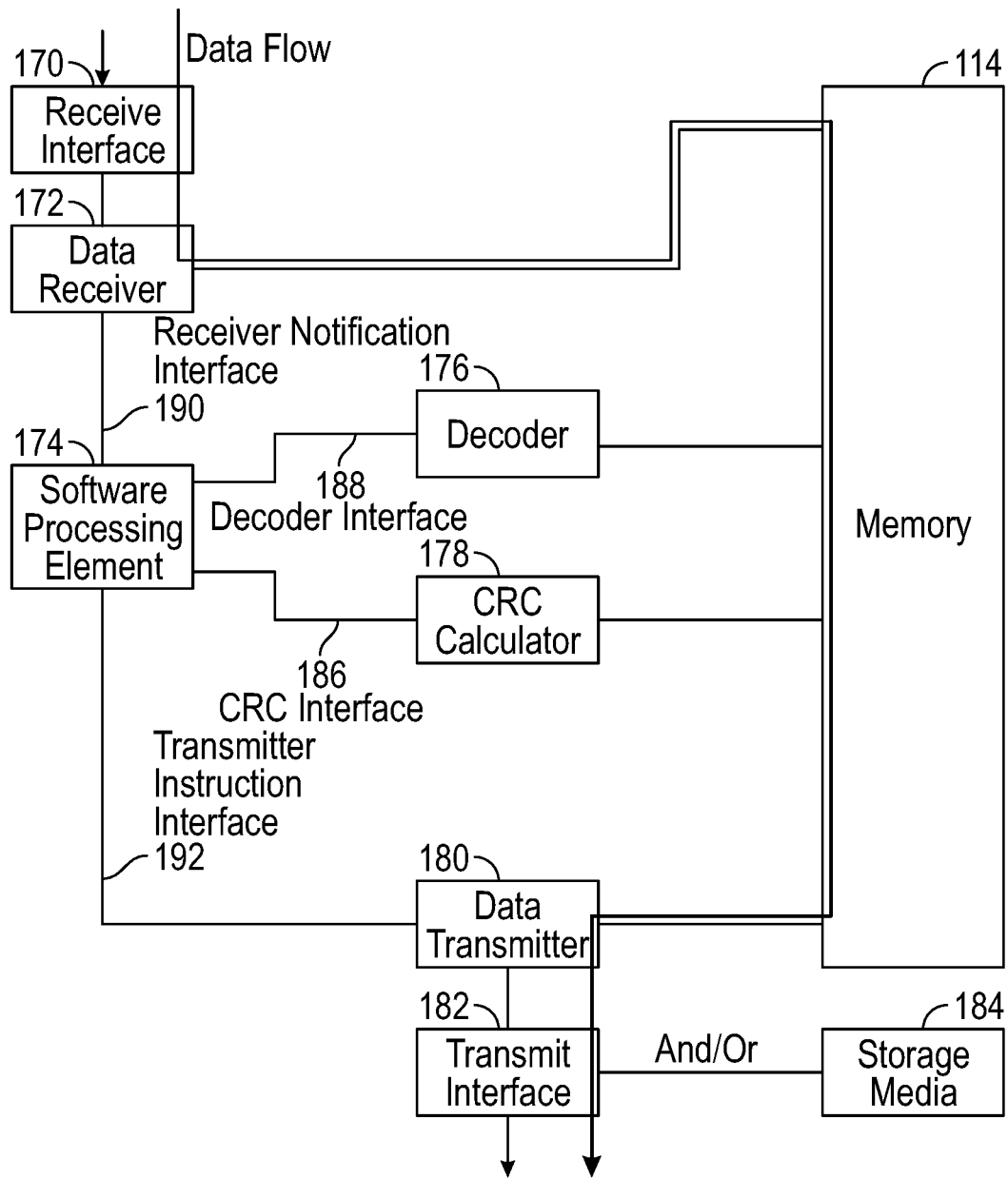
FIG. 8 depicts a configuration of the modules of FIG. 7 for data flow processing, such as processing of video data in accordance with some embodiments.
Figure 9:
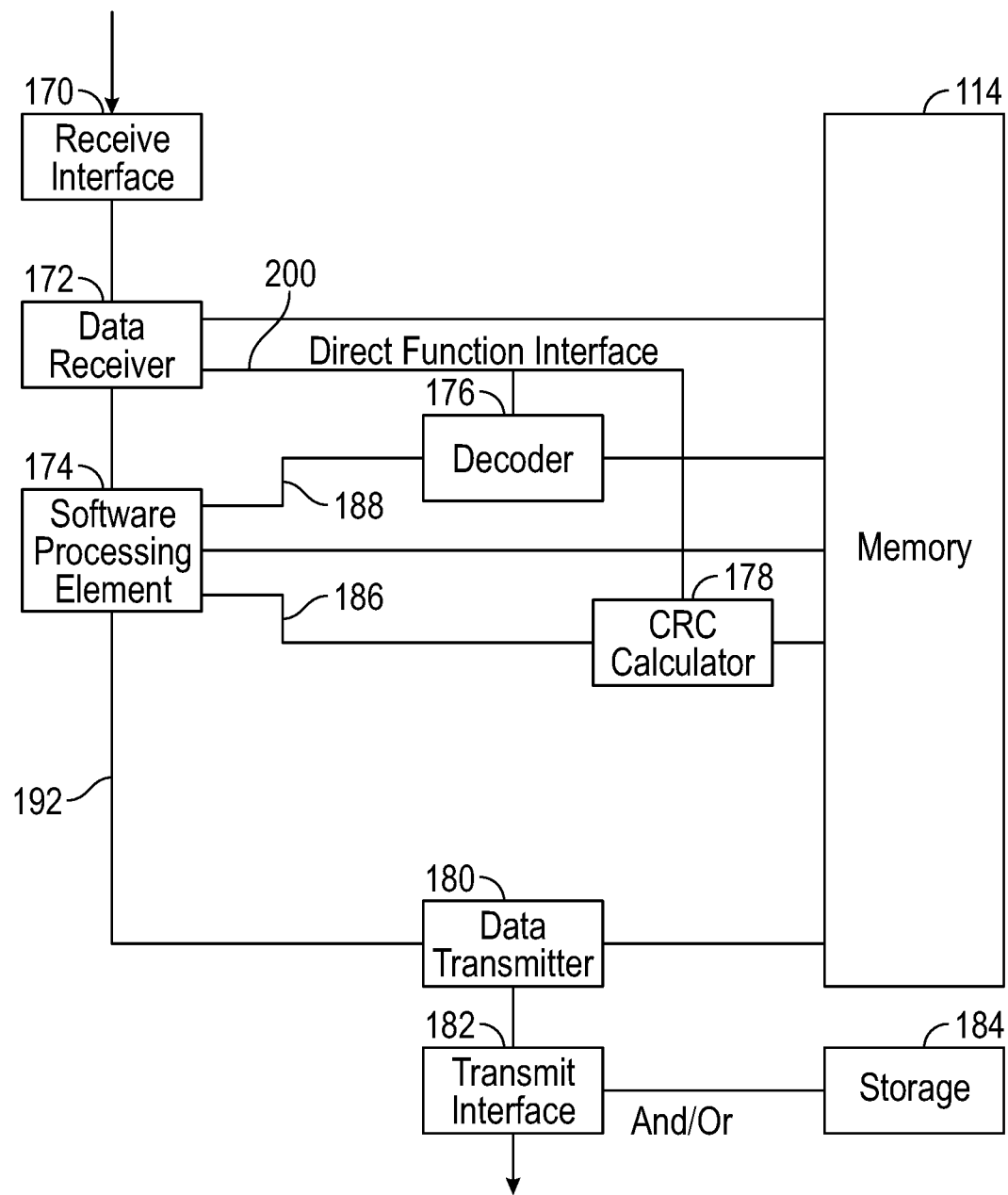
FIG. 9 depicts a further configuration of the modules of FIG. 7, with a direct function interface in accordance with some embodiments.

FIG. 7 is a block diagram of various modules coupled to the Module Message Interface network connection, in an embodiment of the server of FIG. 1A. While not an exhaustive list of possible modules 110, 112 for the server, this set illustrates some of the power, flexibility, and possibilities for configuration for various architectures, of the pods 104 and cards 106. Coupled to the MMI network connection 108 are an MMI router 124, a receive interface 170, a data receiver 172, a software processing element 174, a decoder 176, a CRC (cyclic redundancy check) calculator 178, memory 114, a data transmitter 180, a transmit interface 182, and storage media 184. FIGS. 8 and 9 show two of the possible configurations for these hardware modules 110 and software modules 112, in a data flow system architecture suitable for video processing.

FIG. 8 depicts a possible configuration of the modules of FIG. 7 for data flow processing, such as processing of video data. One or more software processing elements 174 may optionally be deeply embedded within a data flow path in some embodiments. The data flow path has one or more data receivers receiving data from one or more receive interfaces 170, memory 114, and one or more data transmitters 180 transmitting data via one or more transmit interfaces 182. This creates a hybrid hardware and software system to maximize the total system performance. The data receiver directly interfaces to the memory 114 to optionally store received data or a portion thereof and/or metadata, while forwarding notifications to one or more software processing elements 174 via a receiver notification interface 190. The receiver notification interface 190 may be FIFO-based such that a software processing element 174 may treat this hardware interface as a hardware queue, not requiring further buffering or queuing and software, to maximize performance. The data transmitter 180 directly interfaces to the memory 114 to optionally retrieve data or a portion thereof stored by the data receiver 172 and/or metadata, receiving instructions from a software processing element 174 via a transmitter instruction interface 192. The transmitter instruction interface 192 may be FIFO-based such that a software processing element may treat this hardware interface as a hardware queue, not requiring further buffering or queuing and software, to maximize performance. A software processing element 174 may optionally be connected to the memory 114 to inspect data stored by the data receiver 172, modify the data stored by the data receiver 172 and/or use a general memory available to a software processing element 174 for operation.

A CRC calculator 178 is directly connected to the memory 114 and is able to receive instructions from and provide responses to a software processing element 174 via a CRC interface 186. The CRC calculator 178 is under the influence of a software processing element 174 such that the CRC calculator 178 is able to generate a CRC for any data within the memory autonomously, once instructed by the software processing element 174, in parallel with other operations a software processing element 174 may be performing, without the need for the data to be passed to a software processing element 174. Upon completion, the resultant CRC may be reported back to a software processing element 174, stored in memory 114 and/or be validated against a pre-existing CRC within the memory 114 without the validation result being reported back to a software processing element 174.

A decoder 176 is directly connected to the memory 114 and is able to receive instructions and provide responses via a decoder interface 188. The decoder 176 is under the influence of a software processing element 174 such that the decoder 176 is able to decode and analyze the data stored in memory 114 by a data receiver 172 autonomously, once instructed by the software processing element 174, in parallel with other operations a software processing element 174 may be performing, without the need for the data to be passed through a software processing element 174. Upon completion, the decoder informs a software processing element 174 of any findings. Based on these findings, a software processing element 174 determines what is to happen to the stored data, including but not limited to deletion or selecting a particular data transmitter 180 to which to forward the data. Other functions could be carried out on data stored in memory 114 by a data receiver 172 in hardware blocks under the influence of a software processing element 174. Such functions could be creating or modifying data or metadata for storage in the memory 114.

Various trade-offs can be considered during the design stage for configuring this and other data flow architectures. The connections shown in FIG. 8 can be implemented using the MMI network connection 108 among various modules 110, 112 and memory 114. Or, some or many of these connections could be configured directly among modules 110, 112 and memory 114, for example using hardwiring in newly designed pods 104 or cards 106, or configured through the sandboxes 132. There are advantages to each of these approaches, in that hardwiring may be most efficient for hardware processing but not reconfigurable, whereas configuration through sandboxes is reconfigurable (i.e., can be configured initially, then reconfigured at a later time, e.g. for update, upgrade, etc.). And, connection solely or with a majority through the MMI network connection 108 takes the least amount of design work and is the most reconfigurable, but may have longer delays/latency due to the use of packets and network connection rather than direct hardwiring or hardware configuration through sandboxes 132. Various embodiments offer all of these possibilities, for user consideration and optimization in a user-configured architecture for data flow processing.

FIG. 9 depicts a further configuration of the modules of FIG. 7, with a direct function interface 200. In this embodiment, there is a direct function interface 200 between the data receiver 172 and a decoder 176 and/or a CRC calculator 178 or other hardware functions. The data receiver 172 may then directly instruct hardware functions to perform some action on data within the memory 114 and/or generate additional data to store in the memory 114 via the direct function interface 200. Results from the hardware functions may then be reported back to the data receiver 172 via the direct function interface 200 and/or reported to a software processing element 174. Any results returned to the data receiver 172 may then influence a notification issued to a software processing element 174 by a receiver notification interface 190. The memory 114 may be a single memory bank or multiple memory banks, and may be physically implemented with, but not limited to RLDRAM, SRAM, SSRAM, DRAM, flash, 3D Xpoint, etc., or combination thereof.

Figure 10:
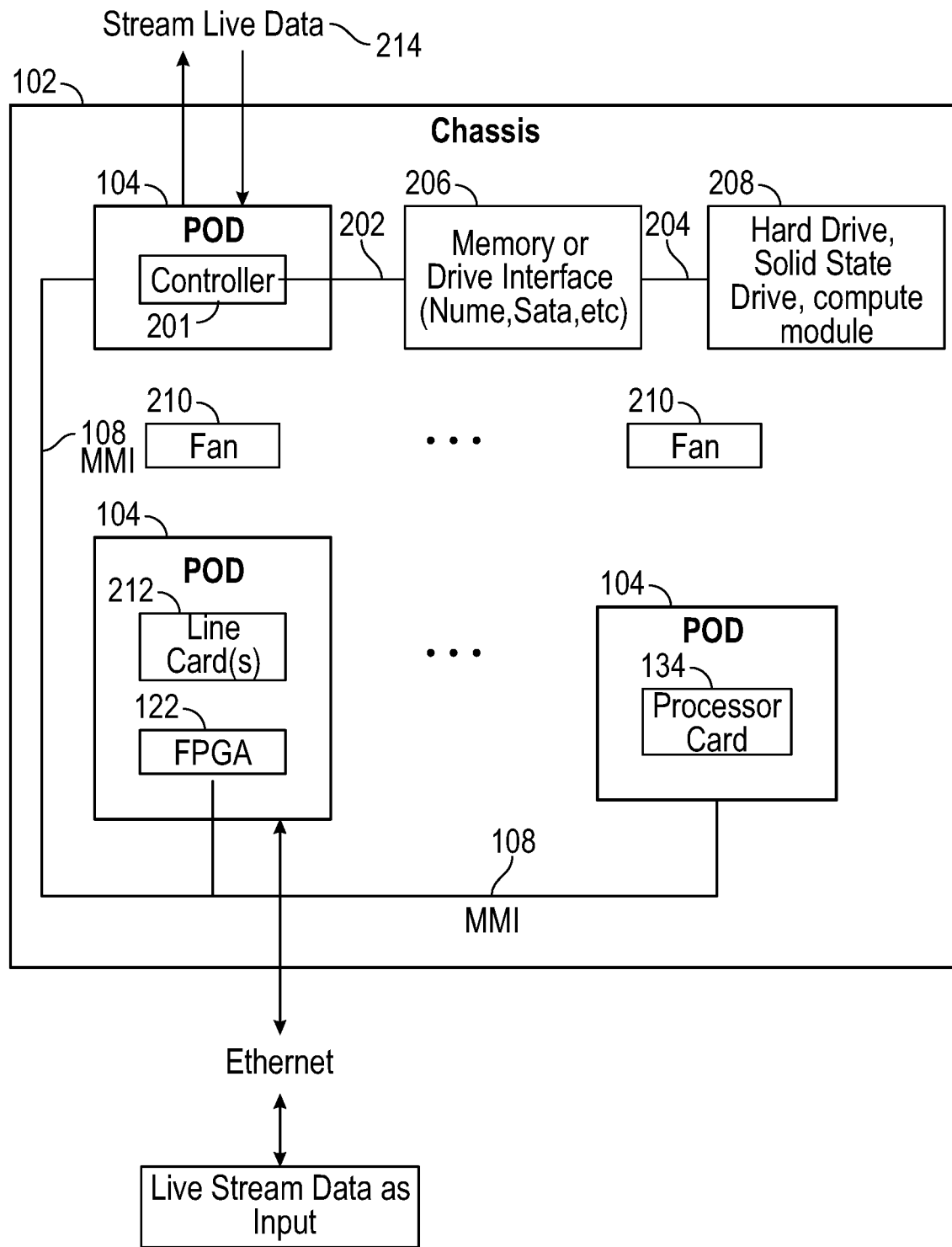
FIG. 10 is a block diagram of an embodiment of the server or platform of FIG. 1A for processing stream live data, including video data in accordance with some embodiments.

FIG. 10 is a block diagram of an embodiment of the server of FIG. 1A for processing stream live data 214, such as video data. For example, the stream live data 214 could be a video data stream from a live event. In the server, a single chassis 102 or multiple chassis 102, several pods 104 are coupled to and connected by the MMI network connection 108. The stream live data 214 enters via an interface, e.g., via Ethernet or a pod 104 with a controller 201 that is coupled to a memory or storage media interface 206, which in turn is coupled to a further module 208 with a hard drive, solid-state drive and/or compute module. Other pods 104 coupled to the MMI network connection 108 include a pod 104 with an Ethernet connection, one or more line cards 212 and an FPGA 122, and a pod 104 with a processor card 134 (or just the processor card 134 inserted into a chassis 102). The stream live data 214 can be stored in one of the storage media devices, before or after processing by a compute module or the processor card 134, and the processed live data can then be streamed out through the pod 104 with the line card(s) 212 to the Ethernet connection. Optional fans 210 cool the various components in the chassis 102. In this embodiment, the memory or drive interface 206 and further module 208 with hard drive, solid-state drive and/or compute module are connected with direct connections 202, 204 and act as resources through the controller 201 coupled to the MMI network. Further pods 104 or cards 106 can be coupled to the MMI network for further processing of the stream live data 214. One example function the pods 104 could perform is video data transcoding, such as from one format to another. This is further developed in FIG. 11.

Figure 11:
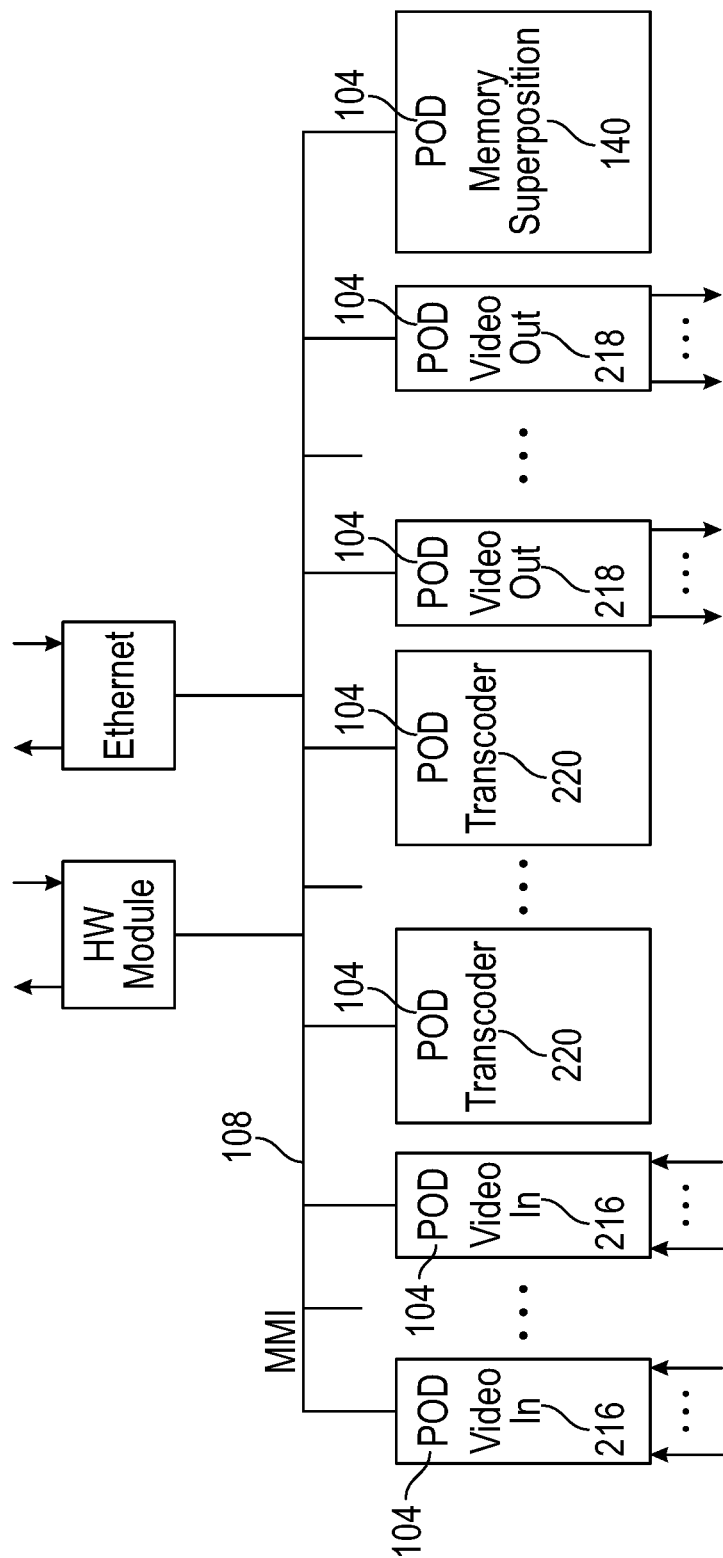
FIG. 11 is a block diagram of an embodiment of the server or platform of FIG. 1A or FIG. 1B for transcoding video from multiple video inputs, for multiple video outputs in accordance with some embodiments.

FIG. 11 is a block diagram of an embodiment of the servers/platforms of FIG. 1A or FIG. 1B for transcoding video from multiple video inputs, for multiple video outputs. Multiple pods 104 each with video in 216, multiple pods 104 each with a transcoder 220, multiple pods 104 each with video out 218, and a pod 104 with memory superposition 140 are coupled to the MMI network connection in one or more chassis 102 (not shown, but see FIGS. 1A and 1B). There could be one or more video inputs on each of the pods 104 and one or more video outputs on each of the pods 104, in various combinations, and further pods 104 added for other functions such as shown in FIGS. 7-9 or as readily devised for further functionality (e.g., DMA or direct memory access attached to memory, a bus and/or the MIMI network, graphics acceleration, audio processing, feature recognition, etc.) in keeping with the teachings herein, in further embodiments.

In one scenario for the server of FIG. 11, there are 18 cameras at a sports event, with data coming in as video data streams (or analog video). And, there are multiple formats and platforms for viewing the live video, such as HDTV (high-definition television), 4K television, browsers on personal computers, smart phones, and possibly even 3-D (three-dimensional, also known as stereo vision) television. An operator, who is monitoring all 18 cameras (or monitors), selects viewpoints, or in a variation customers of the video feeds can select viewpoints. With these inputs, the server switches among the video feeds and transcodes to the various formats, using various types of memory from memory superposition 140, and sends the video out to the various destinations. Further functions that could be implemented in this or other video data stream processing embodiments include facial or object recognition, or scene analysis, e.g. for surveillance video, or to follow a favorite actor, sports team player, celebrity, racehorse or a designated object such as a ball or for that matter a racecar, also picture in picture, split screen, compression, graphics overlays, video processing for special effects, etc.

Opportunities are opened up to analyze data as it flows rather than only post-processing data after data has been stored, reducing overall network usage and associated energy. Further opportunities for variations on the above embodiments include performing scene analysis or facial recognition to incoming security feeds and only storing what is considered interesting, pre-tagging data destined for later search, data mining, database manipulating, intrusion or fraud detection, flagging restricted content wherever it is being moved, analyzing video content and compiling only selected parts, and so on.

These examples from FIGS. 1A-11 are but a small number of the possible architectures and configurations for data flow processing that are possible with embodiments of pods 104 and cards 106. With the flexibility of pod 104 design and substitution, trade-offs and capabilities of hardware modules 110 and software modules 112, memory superposition 140, sandboxes 132 for user-defined functionality, communication and coupling of modules over the MMI network, plus options of direct connections among components, solutions for data flows and data processing needs can be developed in embodiments of what can be termed "hardware defined everything", or HDx in a server. With suitable optimizing among the various trade-offs, such configurations of pods 104 and cards 106 implement hardware-emphasized solutions, possibly with software or firmware offloading of hardware functions, that exceed software-emphasized or software-based implementations in efficiency, throughput, bandwidth, and even power consumption. Bus width, clock speed, cards and modules can all be tailored, by a user, to a specific data flow.

The server with pods 104 and cards 106 that may further be hot-swappable and can be mixed and matched provides a storage agnostic, function agnostic platform to build on top of, with flexibility and programmability. As protocols change, components in the system can be swapped, upgraded or reconfigured but will still provide an advantage in hardware over software-only or software-centric systems. The use of FPGAs 122, and especially with the introduction of sandboxes 132, support the "hardware defined everything" concept, and allow systems to be built for what's next, i.e., systems not yet designed. Memory superposition 140 abstracts the media behind the scenes, and presents an interface with an address range and automatic optimization of type of memory for calculating on data going by. Processing element superposition abstracts processing elements behind the scenes, and presents a common interface. The MMI router 124 and bridge 128, in the FPGA 122, and more generally the MMI network, pods 104 and cards 106, act as a foundation on which to build a data flow/data processing architecture, with reprogrammable blocks that can implement functions and acceleration for functions. MMI is messaging based, to uniquely address any module, including third-party drop in modules.

In order to support the server with user-reconfigurable pods 104 and cards 106, so that users can implement data flow processing architectures with various embodiments of the system, a development kit could be provided. The development kit follows the apps (applications) model of software development kits (SDK) for third parties to develop applications to run on a platform. An SSDK (semi-soft development kit), an HSDK (hardware/software development kit), or an HDxK (hardware defined everything development kit) provides access, definition and control of the sandboxes 132, and software for processing elements in the FPGA 122 or external to the FPGA 122, e.g., in a processor card 134 (see FIG. 4) or one or more processors elsewhere in a pod 104. A development kit could be extended to provide design services for custom pods 104 or cards 106, which could optionally include or exclude the FPGA 122. FPGA 122 elements, such as base blocks, the MMI router 124, ports, hardware FIFOs, processors or processor cores, sandboxes 132, etc. could be offered for example in a library and/or a user area could be defined as open and reconfigurable. A development kit that is centric around data flows could offer analysis of metrics such as data throughput, bandwidth, energy consumption, network usage, memory usage, bottlenecks, etc., so that the user can pursue optimization of various data flow architectures during a development phase, then select an architecture to implement (i.e., configure) in the system. In some embodiments, an Apps model may be employed as enabled by the common defined interface made possible through the MMI sandbox. That is, a market place to buy, sell, trade Intellectual Property (IP) sandbox modules is made possible through the platform described herein. It should be appreciated that the Apps model may be implemented in hardware, software or some combination of the two.

Figure 12:
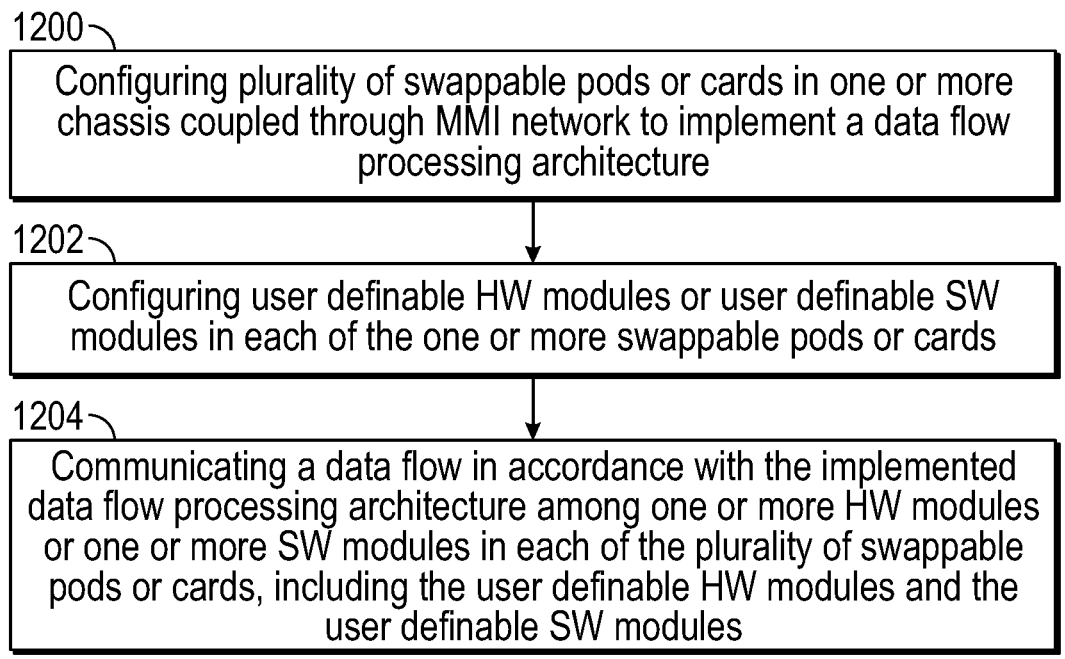
FIG. 12 is a flow diagram for a method for data flow processing in the platform described herein in accordance with some embodiments.

FIG. 12 is a flow diagram for a method for data flow processing in the platform described herein in accordance with some embodiments. The method includes configuring a plurality of swappable pods, hardware modules, or cards in one or more chassis, coupled through a module messaging interface network, to implement a data flow processing architecture in action 1200. The MMI network/protocol may include the mechanism described above and may include the header CRC and CRC mechanism described with regard to FIGS. 6A and 6B-1-3. In action 1202 the method includes configuring user-definable hardware modules or user-definable software modules in each of one or more of the plurality of swappable pods, hardware modules, or cards. In an action 1204 the method includes communicating a data flow in accordance with the implemented data flow processing architecture among one or more hardware modules or one or more software modules in each of the plurality of swappable pods, hardware modules, or cards, including the user-definable hardware modules or user-definable software modules. The communicating the data flow through the module messaging interface network, may include a network coupled to the plurality of swappable pods, hardware modules, or cards and/or a protocol supporting messaging-based communication using packets each having a header with a chassis identifier, a board identifier, a module identifier, an instance identifier, and a type identifier, so that each type of module, each instance of a type of module, and each module on each board in each chassis can be addressed through the header. In some embodiments the method may include selecting a memory superposition in at least one of the plurality of swappable pods, hardware modules, or cards having a plurality of types of memory with selectable arrangement of the plurality of types of memory as multilevel cache, interleaved memory, swapped memory over a specified address range, and memory allocated to specified address ranges according to parameterized task needs as described above.

Figure 13:
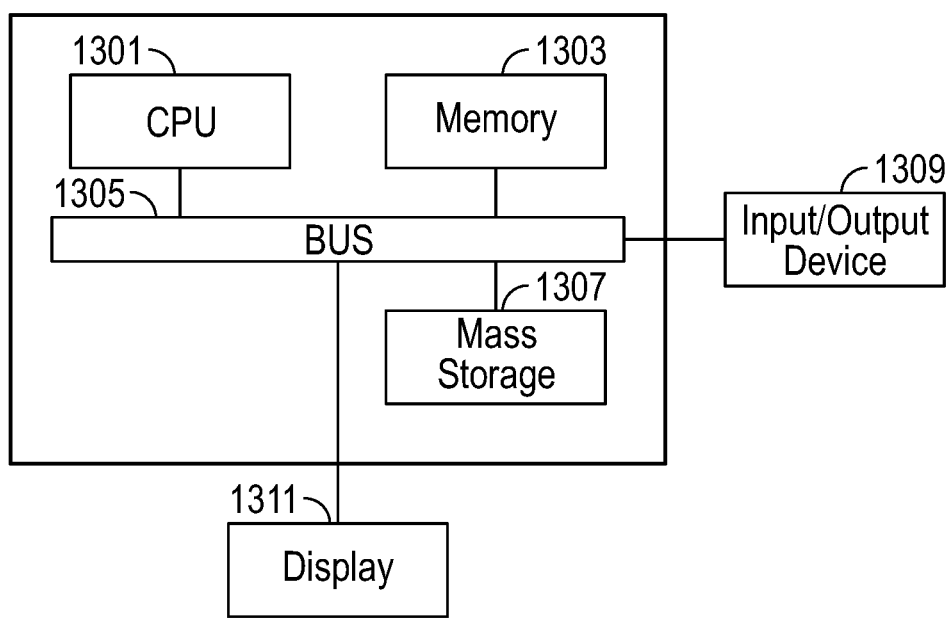
FIG. 13 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 13 is an illustration showing an exemplary computing device which may implement the embodiments described herein. The computing device of FIG. 13 may be used to perform embodiments of the functionality for a configurable server and a development kit in accordance with some embodiments. The computing device includes a central processing unit (CPU) 1301, which is coupled through a bus 1305 to a memory 1303, and mass storage device 1307. Mass storage device 1307 represents a persistent data storage device such as a floppy disc drive or a fixed disc drive, which may be local or remote in some embodiments. The mass storage device 1307 could implement a backup storage, in some embodiments. Memory 1303 may include read only memory, random access memory, etc. Applications resident on the computing device may be stored on or accessed via a computer readable medium such as memory 1303 or mass storage device 1307 in some embodiments. Applications may also be in the form of modulated electronic signals modulated accessed via a network modem or other network interface of the computing device. It should be appreciated that CPU 1301 may be embodied in a general-purpose processor, a special purpose processor, or a specially programmed logic device in some embodiments.

Display 1311 is in communication with CPU 1301, memory 1303, and mass storage device 1307, through bus 1305. Display 1311 is configured to display any visualization tools or reports associated with the system described herein. Input/output device 1309 is coupled to bus 1305 in order to communicate information in command selections to CPU 1301. It should be appreciated that data to and from external devices may be communicated through the input/output device 1309. CPU 1301 can be defined to execute the functionality described herein to enable the functionality described with reference to FIGS. 1-12. The code embodying this functionality may be stored within memory 1303 or mass storage device 1307 for execution by a processor such as CPU 1301 in some embodiments. The operating system on the computing device may be MS DOS™, MS-WINDOWS™, OS/2™, UNIX™, LINUX™, or other known operating systems. Selected should be appreciated that the methods through resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A programmable device for data flow processing in a user-configurable server with swappable pods or cards, comprising:
   a programmable logic device (PLD) having a first region and a second region;
   the first region comprising a hardware-based or firmware-based router with a port enabling communication between the router and the second region; and
   the second region comprising one or more sandboxes with user-definable programmable electronic circuits of the PLD,
   wherein the port comprises: a bridge being lockable to prevent user access, and unlockable to enable user access, to each of the sandboxes and the user-definable programmable electronic circuits therein.

2. The programmable device of claim 1, further comprising:
   the router communicative to translate between a first protocol and a second protocol, for messaging with system resources.

3. The programmable device of claim 1, wherein each of the sandboxes comprises user-programmable one or more of: analog circuitry, digital circuitry, memory, processors or controllers.

4. The programmable device of claim 1, wherein the port comprises:
   a bridge being lockable to prevent reconfiguration of the bridge and prevent reconfiguration of the router while enabling reconfiguration of the one or more sandboxes.

5. The programmable device of claim 1, wherein the port comprises:
   a bridge having a security layer to authenticate a user or verify a permission, to reconfigure one or more of the one or more sandboxes.

6. The programmable device of claim 1, further comprising:
   the router configured to perform analytics on resources of the programmable device, on a per module basis, including determining communication bandwidth and resource utilization.

7. The programmable device of claim 1, wherein the one or more sandboxes each comprise port interfaces that are configurable as to data width or speed.

8. The programmable device of claim 1, wherein the one or more sandboxes each comprise clock cycle utilization regulation for controlling power consumption or thermal characteristics.

9. The programmable device of claim 1, wherein the one or more sandboxes comprises a plurality of sandboxes that are logically or physically combinable to form a larger sandbox.

10. A programmable device for data flow processing in a user-configurable server, comprising:
    a programmable logic device (PLD) having a first region and a second region;
    the first region comprising a hardware-based or firmware-based router having a bridge with a port enabling communication between the router and the second region;
    the second region comprising a plurality of sandboxes with user-definable programmable electronic circuits of the PLD; and
    an internal communication network in the PLD, coupling the port of the bridge of the router and the one or more sandboxes for the data flow processing,
    wherein the bridge is lockable to prevent user access, and unlockable to enable user access, to the plurality of sandboxes and user-definable programmable electronic circuits therein.

11. The programmable device of claim 10, further comprising:
    the router to translate between a first protocol used external to the second region and a second protocol used in the internal communication network in the PLD.

12. The programmable device of claim 10, wherein each of the plurality of sandboxes comprises user-programmable one or more of: analog circuitry, digital circuitry, memory, processors or controllers.

13. The programmable device of claim 10, wherein the bridge is lockable to enable reconfiguration of the plurality of sandboxes, prevent reconfiguration of the bridge and prevent reconfiguration of the router.

14. The programmable device of claim 10, wherein the bridge has a security layer to authenticate a user or verify a permission, to reconfigure one or more of the plurality of sandboxes.

15. The programmable device of claim 10, further comprising:
    the router configured to perform analytics on resources of the programmable device, on a per module basis, including determining communication bandwidth and resource utilization in the plurality of sandboxes.

16. The programmable device of claim 10, wherein the each of the plurality of sandboxes comprises one or more port interfaces configurable as to data width or speed.

17. The programmable device of claim 10, wherein each of the plurality of more sandboxes comprises clock cycle utilization regulation for controlling power consumption or thermal characteristics.

18. The programmable device of claim 10, wherein the plurality of sandboxes is logically or physically combinable to form a single, larger sandbox.

* * * * *